United States Patent
Rajagopal et al.

(10) Patent No.: US 10,944,668 B2
(45) Date of Patent: Mar. 9, 2021

(54) SYSTEM AND METHOD FOR SUPPORTING LOW LATENCY APPLICATIONS IN A CLOUD RADIO ACCESS NETWORK

(71) Applicant: MAVENIR NETWORKS, INC., Richardson, TX (US)

(72) Inventors: Sridhar Rajagopal, Plano, TX (US); Pardeep Kohli, Plano, TX (US)

(73) Assignee: Mavenir Networks, Inc., Richardson, TX (US)

( * ) Notice: Subject to any disclaimer, the term of this patent is extended or adjusted under 35 U.S.C. 154(b) by 92 days.

(21) Appl. No.: 15/903,240

(22) Filed: Feb. 23, 2018

(65) Prior Publication Data

US 2018/0248787 A1  Aug. 30, 2018

Related U.S. Application Data

(60) Provisional application No. 62/463,786, filed on Feb. 27, 2017.

(51) Int. Cl.
*H04L 12/725* (2013.01)
*H04W 72/08* (2009.01)
(Continued)

(52) U.S. Cl.
CPC .......... *H04L 45/3065* (2013.01); *H04L 45/70* (2013.01); *H04W 28/0215* (2013.01);
(Continued)

(58) Field of Classification Search
CPC ... H04W 48/18; H04W 88/085; H04W 16/02; H04W 28/16; H04W 84/00; H04L 12/46; H04L 12/66; H04B 10/25753
See application file for complete search history.

(56) References Cited

U.S. PATENT DOCUMENTS 9,462,477 B2    10/2016  Ahmad et al.
2013/0017852 A1  1/2013  Liu et al.
(Continued)

OTHER PUBLICATIONS

International Written Opinion and Search Report for the corresponding International application PCT/US2018/019324, dated May 25, 2018, 9 pages.

(Continued)

*Primary Examiner* — Elton Williams
(74) *Attorney, Agent, or Firm* — Ohlandt, Greeley, Ruggiero & Perle, L.L.P.

(57) ABSTRACT

There is provided a system that includes a local cloud radio access network (RAN), and a remote cloud RAN. The local cloud RAN processes latency-sensitive applications, and the remote cloud RAN processes latency-tolerant applications. User traffic is appropriately routed to the correct cloud RAN based on the application. User equipment (UE) has no knowledge of which network is being used for processing, i.e., this network processing split is done in a manner that is transparent to the UE, e.g., by dynamically selecting a different access point name for local vs. remote processing. The processing split of the RAN between the local cloud RAN and the remote cloud RAN is done in a dynamic manner depending on the number of devices requiring low latency support. This allows the local cloud RAN to be very compact and low-cost since it does not have to process the latency-tolerant traffic.

14 Claims, 11 Drawing Sheets

(51) Int. Cl.
*H04L 12/721* (2013.01)
*H04W 28/02* (2009.01)
*H04W 28/16* (2009.01)
*H04W 88/08* (2009.01)
*H04W 60/00* (2009.01)
*H04W 92/20* (2009.01)

(52) U.S. Cl.
CPC ... *H04W 28/0252* (2013.01); *H04W 28/0278* (2013.01); *H04W 28/16* (2013.01); *H04W 72/087* (2013.01); *H04W 60/005* (2013.01); *H04W 88/085* (2013.01); *H04W 92/20* (2013.01)

(56) References Cited

U.S. PATENT DOCUMENTS

2014/0086177 A1* 3/2014 Adjakple ............. H04W 12/08
370/329
2015/0358829 A1* 12/2015 Arnott .................. H04W 72/06
455/454
2016/0073426 A1 3/2016 Bull et al.
2017/0079059 A1* 3/2017 Li ........................ H04W 16/02
2017/0272365 A1* 9/2017 Wei ....................... H04L 45/302

OTHER PUBLICATIONS

Small Cell Forum Release 9.0; Document 082.09.05, May 2017, http://scf.io/en/documents/082_-_nFAPI_and_FAPI_specifications.php; 335 pages.

International Preliminary Report on Patentability for the corresponding International application PCT/US2018/019324, dated May 7, 2019, 18 pages.

* cited by examiner

SYSTEM AND METHOD FOR SUPPORTING LOW LATENCY APPLICATIONS IN A CLOUD RADIO ACCESS NETWORK

CROSS REFERENCE TO RELATED APPLICATION

This application claims the benefit of U.S. Patent Application No. 62/463,786 filed on Feb. 27, 2017, the entire contents of all of which are incorporated by reference herein.

BACKGROUND OF THE DISCLOSURE

1. Field of the Disclosure

The present disclosure relates to wireless communication systems targeted towards a radio access network (RAN) that is implemented in a distributed manner where parts of the RAN processing are performed at a cell site or tower while the rest of the RAN processing can be performed remotely in data centers in the cloud, i.e., a cloud RAN (C-RAN).

2. Description of the Related Art

The approaches described in this section are approaches that could be pursued, but not necessarily approaches that have been previously conceived or pursued. Therefore, the approaches described in this section may not be prior art to the present disclosure and are not admitted being prior art by inclusion in this section.

Cloud RAN provides centralization and virtualization of a RAN, leading to benefits such as (a) operation cost reduction due to resource pooling and running the RAN on general-purpose hardware, enabling economies of scale, (b) performance improvements due to better interference management, (c) remote upgradeability and management of the RAN and (d) simpler migration to add new features and transition from 4G to 5G networks.

Traditional RANs implement the protocol stack (e.g., Physical Layer (PHY), Medium Access Control (MAC), Radio Link Control (RLC), Packet Data Convergence Control (PDCP layers)) at a base-station (also referred to as an eNodeB). In cloud RAN, different radio functions are split between a remote radio unit (RRU) and a baseband unit (BBU). The RRU is implemented locally onsite, while the BBU is virtualized on the cloud, which could be tens or hundreds of miles away from the RRU. A single BBU (or vRAN) can control multiples of RRUs in different locations.

One split scenario between the BBU and the RRU, for example, is to split the protocol stack at the PHY layer, where the Radio Frequency (RF) operation and lower PHY functions (e.g., orthogonal frequency division multiplexing (OFDM) modulation for downlink (DL): inverse fast Fourier transform (IFFT), cyclic prefix (CP) addition, and OFDM demodulation for uplink (UL): fast Fourier transform (FFT), CP removal) are executed at the RRU. On the other hand, the rest of the RAN functions (e.g., Turbo encoding/decoding, bit interleaving/scrambling, channel estimation, equalization, scheduler, etc.) are done at the cloud.

Various options exist for the fronthaul connection between the BBU and the RRU such as using Ethernet, fiber, etc. This fronthaul communication, which is crucial for data and control communications between the RRU and the BBU, adds additional delay for cloud RAN systems.

One of the main challenges in centralization of the processing is meeting the latency requirement imposed by the RAN processing. This problem is exacerbated by a new class of low latency applications being considered for 5G communication systems, requiring support for sub-millisecond latency, making remote processing difficult if not impossible for such applications. Examples of such systems include industry automation, self-driving cars and mission-critical applications.

Low latency applications for cloud RAN are typically handled by running the RAN and core protocol stacks at the edge of the network, where the RRUs and BBU are located locally along with the core network for local offloading and processing of data traffic. Mobile-Edge Computing (MEC) offers application developers and content providers cloud-computing capabilities and an IT (information technology) service environment at the edge of the mobile network. This environment is characterized by ultra-low latency and high bandwidth as well as real-time access to radio network information that can be leveraged by applications.

Another similar approach which has been proposed for low latency support is fog computing. Fog computing uses one or more collaborative multitude of end-user clients or near-user edge devices to carry out a substantial amount of storage (rather than stored primarily in cloud data centers), communication (rather than routed over the Internet backbone), control, configuration, measurement and management (rather than controlled primarily by network gateways such as those in the Long-Term Evolution (LTE) core network).

The limitation of such systems is that not all network applications require such low latency support, leading to overprovisioning of the local cloud RAN and increased costs.

SUMMARY OF THE DISCLOSURE

There is provided a system that includes a local cloud radio access network (RAN), and a remote cloud RAN having a non-ideal fronthaul. The local cloud RAN processes latency-sensitive applications, and the remote cloud RAN processes latency-tolerant applications.

The local cloud RAN has a local scheduler. The remote cloud RAN has a remote scheduler. The remote scheduler informs the local scheduler of available time/frequency resources for scheduling latency-sensitive user equipment. The local scheduler schedules the latency-sensitive user equipment based on the available time/frequency resources.

The local cloud RAN has currently available resources for supporting latency critical applications, and informs the remote cloud RAN of said currently available resources. The remote cloud RAN adjusts a resource allocation split between the local cloud RAN and the remote cloud RAN.

The system may also include a remote radio unit that performs cell level processing.

The system may also include a remote radio unit at which is implemented a physical layer of a protocol stack. The local cloud RAN and the remote cloud RAN process medium access control and upper layers of the protocol stack.

The local cloud RAN implements a first waveform numerology optimized for the latency-sensitive applications. The remote cloud RAN implements a second waveform numerology optimized for the latency-tolerant applications.

The latency-sensitive applications may require a latency of less than 10 milliseconds. The latency-tolerant applications can tolerate a latency of greater than 30 milliseconds. These numbers are provided as examples and not a limitation of this disclosure.

BRIEF DESCRIPTION OF THE DRAWINGS

A component or a feature that is common to more than one drawing is indicated with the same reference number in each of the drawings.

DESCRIPTION OF THE DISCLOSURE

Figure 1:
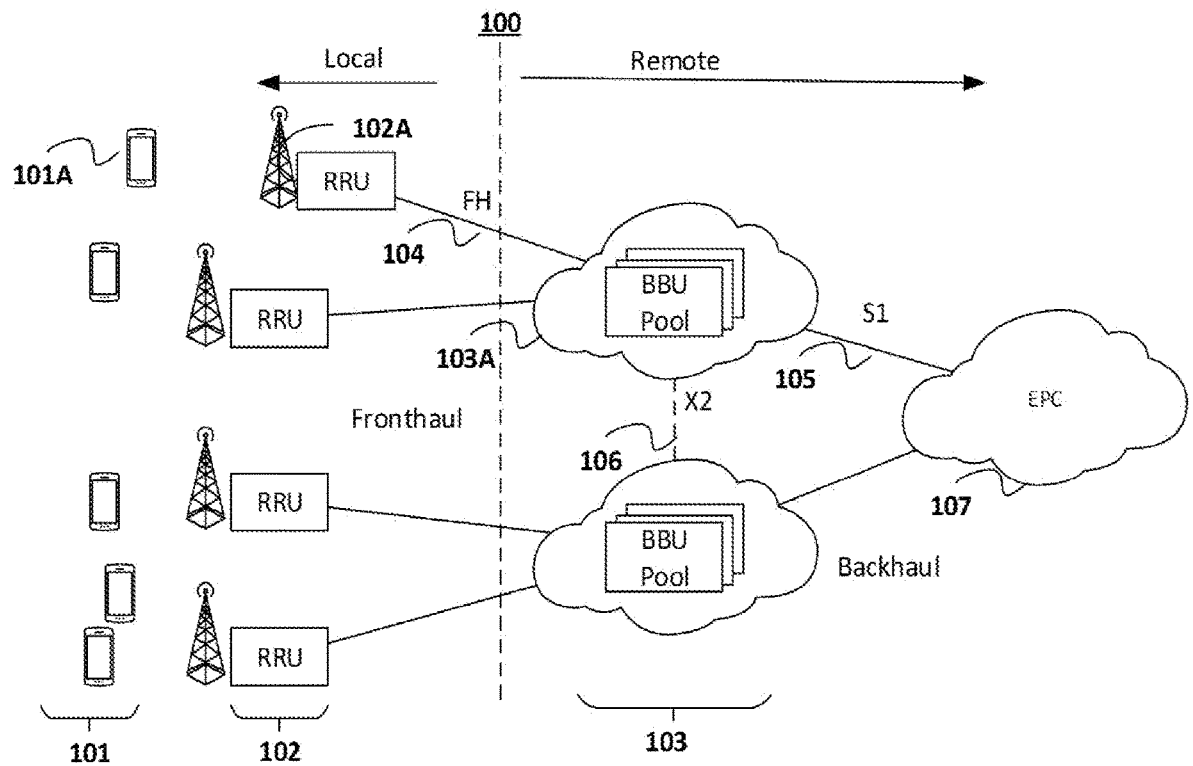
FIG. 1 illustrates a cloud RAN.

The present disclosure provides a technique to handle low latency applications for cloud RAN systems by supporting both a local cloud RAN with limited resources that is used only for low latency applications (e.g., latency <10 milliseconds (ms)) while a remote cloud RAN handles latency-tolerant applications (e.g., latency >10 ms). The user traffic is appropriately routed to the correct cloud RAN based on the application. The user equipment (UE) has no knowledge of which network has been used for processing, i.e., this network processing split is done in a manner that is transparent to the UE, for example, by dynamically selecting a different access point name (APN) for local vs. remote processing. The processing split of the RAN between the local cloud RAN and the remote cloud RAN is done in a dynamic manner depending on the number of devices requiring low latency support. This allows the local cloud RAN to be very compact and low-cost since it does not have to process the latency-tolerant traffic.

FIGS. 1 through 11, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged system or device.

The femto application platform interface nFAPI and FAPI specification document SCF082, defined by the Small Cell Forum (SFC) are hereby incorporated by reference into the present disclosure as if fully set forth herein. The SCF is a forum that promotes small cell adoption to change the shape of mobile networks and maximize the potential of mobile services.

Mobile networks are evolving quickly in terms of coverage, capacity and new features, continuously pushed by new requirements relating to latency, traffic volumes and data rates.

A RAN is the equipment that connects to cellular antennas, processes the signal and sends it to the core network. As the demand for connectivity has exploded, mobile operators have looked for ways to minimize the footprint and cost of their equipment. This has led to the move to centralize parts of the RAN. Specifically, a BBU is the part of the RAN that carriers may move to a central location from which multiple RRUs can be served. Fiber is typically used to connect BBUs to RRUs, and this connection is often referred to as "fronthaul" as opposed to backhaul, which refers to the connection of the RAN to the core network. In some architectures, the BBUs are linked and can share information, and in others they are simply located in the same area. Cloud RAN implies that the baseband processing is handled primarily in software and is run on a generic "white box" server in the cloud. By introducing cloud RAN architectures, operators will be able to meet accelerating demands of cellular networks through the use of Network Functions Virtualization (NFV) techniques and data center processing capabilities in their networks, which allows for resource pooling, scalability, layer interworking and spectral efficiency.

In some cases, a BBU is also known as a Central Unit (CU) that processes data and an RRU is known as a Distributed Unit (DU). The RRU may also be denoted as a remote radio head (RRH) in some cases. In other cases, for 5G, the BBU is split into CU and DU while the RRH is referred to as a transmit-receive point (TRP). In some cases, the BBU implementation is referred to as a Virtual Network Function (VNF) while the RRU implementation is referred to as a Physical Network Function (PNF).

FIG. 1 illustrates a cloud RAN 100 that includes (a) a plurality of UEs 101, one of which is designated as UE 101A, (b) a plurality of RRUs 102, one of which is designated as RRU 102A, (c) a plurality of BBU pools 103, one of which is designated as BBU pool 103A, and an evolved packet core (EPC) network 107. A local network comprises RRUs 102, which are connected to remote BBU pools 103 in the cloud using a fronthaul interface (FH), one of which is designated as FH 104. Here, "local" refers to a very short distance from the RRUs 102 (such at the same cell site or at the edge of a enterprise network, typically 10-100's of meters), while "remote" refers to a longer distance, e.g., one or more kilometers, from the RRU. RRUs 102 may have limited processing capability to send RF signals to the BBU pools 103 or may have some amount of compression to limit the traffic on the fronthaul. BBU pools 103 may be connected to other BBU pools 103 via an X2 interface, e.g., X2 interface 106, and connected to EPC network 107 via an S1 interface, e.g., S1 interface 105.

The fronthaul latency is a critical component that determines the applications supported by cloud RAN 100. A one-way latency of <250 microseconds (μs), which can be supported by fiber, is typically assumed for cloud RAN systems. A non-ideal one-way latency would be considered as <30 ms, while <2 ms and <6 ms are defined as near-ideal and sub-ideal latencies, respectively, by the SCF. Note that these are fronthaul latencies for the transport and are much stricter than the end-to-end latencies needed for the application.

5G networks will be built around people and things and will natively meet the requirements of three groups of use cases:

1. Enhanced Mobile broadband (eMBB) that delivers gigabytes of bandwidth on demand.
2. Massive machine-type communication (mMTC) that connects billions of sensors and machines.
3. Ultra-reliable and low latency communication (URLLC) for applications with high reliability and low latency constraints and enables, for example, remote control over robots and autonomous driving.

While the first two classes of applications can tolerate latency, the third application may require latencies in the order of the few milliseconds (or even shorter) at the application layer. This would be difficult to achieve in a cloud RAN, if the fronthaul is not ideal.

To support low latency applications, various methods exist such as Mobile-edge computing (MEC) and multi-tier cloud networks.

One method to support low latency applications is by moving the RAN processing (compute) to the edge of the network. Mobile Edge Computing (MEC) is a network architecture concept that enables cloud computing capabilities and an IT service environment at the edge of the cellular network. The basic idea behind MEC is that by running applications and performing related processing tasks closer to the cellular customer, network congestion is reduced and applications perform better. MEC technology is designed to be implemented at the cellular base stations, and enables flexible and rapid deployment of new applications and services for customers. Combining elements of information technology and telecommunications networking, MEC also allows cellular operators to open their RAN to authorized third-parties, such as application developers and content providers.

Figure 2:
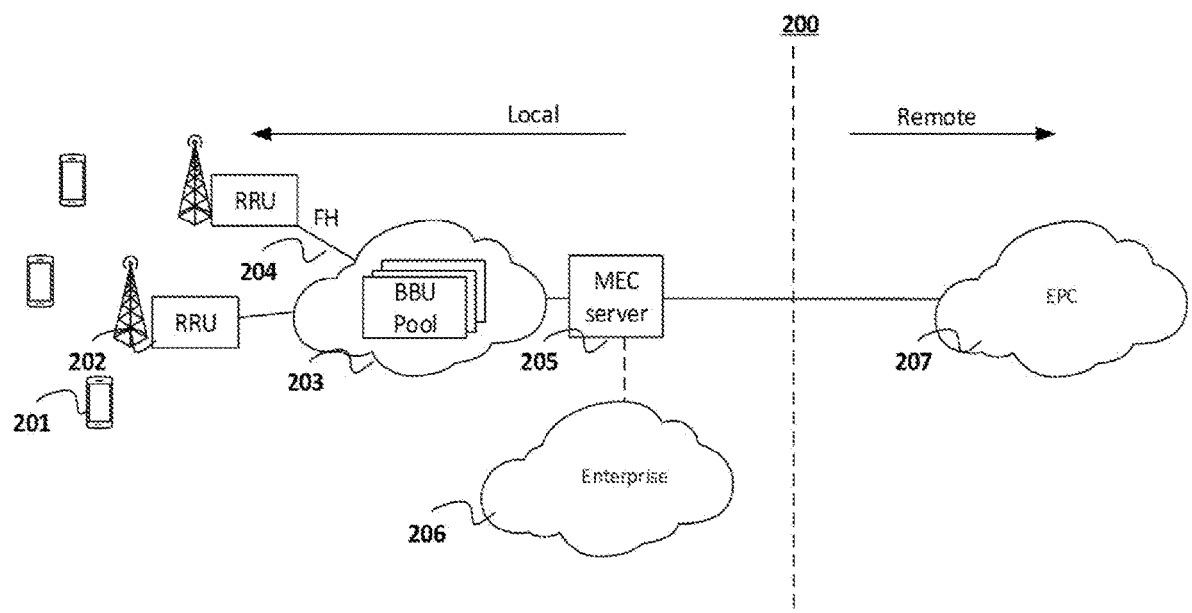
FIG. 2 illustrates a mobile edge computing based cloud RAN.

FIG. 2 illustrates a mobile edge computing based cloud RAN 200. An ideal fronthaul FH 204 is assumed for the connection between an RRU 202 and a BBU pool 203 located at the network edge. Both BBU pool 203 and RRU 202 are considered local in this deployment to support low latency communication with UE 201, and BBU pool 203 is thus regarded as a local cloud RAN. A MEC server 205 connects BBU 203 to a local enterprise environment 206 and an EPC network 207. MEC server 205 provides computing resources, storage capacity, connectivity and access to RAN information, and supports a multitenancy run-time and hosting environment for applications.

Another option to provide low latency support is to break the cloud RAN into multiple tiers.

Figure 3:
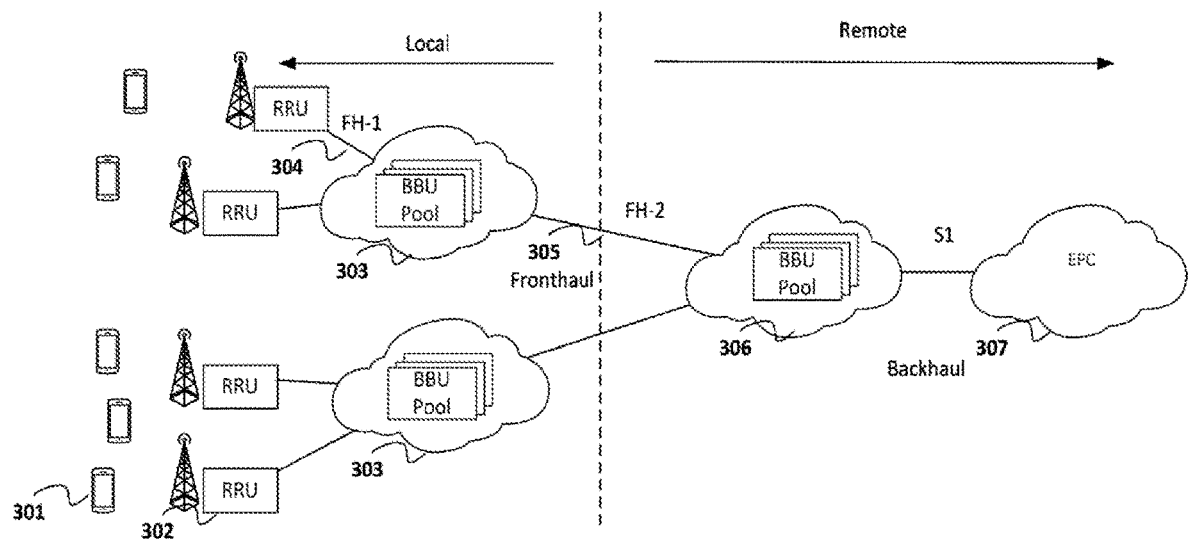
FIG. 3 illustrates a multi-tier cloud RAN.

FIG. 3 illustrates a multi-tier cloud network. The low latency related aspects related to RAN processing for UE 301 can be handled by a local cloud RAN 303 while the less stringent aspects can be handled by a remote cloud RAN 306. Local cloud RAN 303 and remote cloud RAN 306 layering can provide function aggregation and statistical multiplexing gains. For example, the PHY can be done in an RRU 302, the MAC can be done in local cloud RAN 303 and the RLC/PDCP layers can be implemented in remote cloud RAN 306. A fronthaul interface FH-1 304 is a low latency fronthaul (near-ideal as defined above) to a BBU pool in local cloud RAN 303 where lower layer processing is performed, while a fronthaul interface FH-2 305 can be higher latency fronthaul (close to near-ideal or non-ideal as defined above) to a BBU pool in remote cloud RAN 306, where the upper layers of the protocol stack are processed. Remote cloud RAN 306 is connected to an EPC network 307 via an S1 interface.

In the approaches discussed in FIG. 2 and FIG. 3, all baseband processing data is first processed by the local cloud RAN. The baseband computation, esp. related to layer 1 processing can form a significant portion of the resource utilization in the local cloud RAN. This implies the local cloud RAN will require deployment of significant resources to handle the processing of both latency-tolerant as well as latency-sensitive applications.

In the present disclosure, a split cloud RAN architecture is proposed where the local cloud RAN only handles the processing of latency-sensitive applications while the latency-tolerant applications are handled by the remote cloud RAN. This allows the local cloud RAN to be built in a cost-effective manner with limited processing resources as it need not process latency-tolerant applications such as remote file transfer or video uploads that may be very compute intensive.

Figure 4:
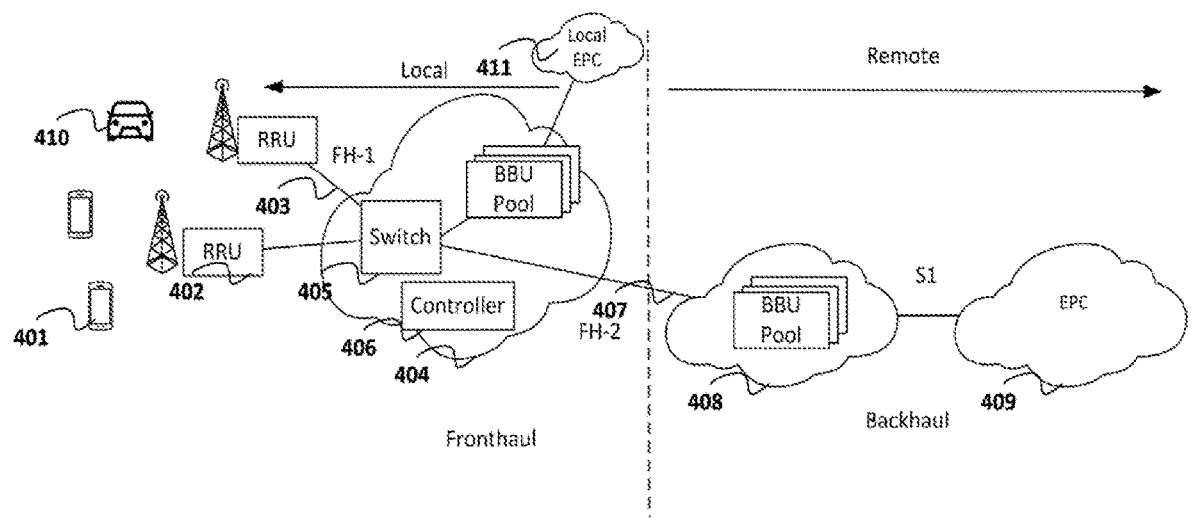
FIG. 4 illustrates a split cloud RAN architecture where processing is split between a local cloud RAN and a remote cloud RAN.

FIG. 4 illustrates a split cloud RAN architecture where processing is split between a local cloud RAN 404 and a remote cloud RAN 408. A fronthaul interface FH-1 403 is an ideal fronthaul that connects RRUs 402 to local cloud RAN 404. Once data reaches local cloud RAN 404, a switch 405 distributes the data for further processing either in local cloud RAN 404 or in remote cloud RAN 408 depending on the requirements of the application from a UE 401, e.g., a cell phone, or a UE 410, e.g., an autonomous car. Remote cloud RAN 408 is connected to an EPC 409.

The knowledge of whether UE 401 or UE 410 requests a low latency application or not can be based on several factors. For example, this could be by a low latency UE 410, e.g., an autonomous car, indicating it in its capabilities that it is supporting low latency applications, when it attaches to the network. It is also possible that UEs can dynamically select between low latency and latency-tolerant applications based on the APN, for example. The network attachment process is first performed by remote cloud RAN 408. Based on the requirements of UE 410 to support low latency, the processing of UE 410 is transferred to local cloud RAN 404, using fronthaul interface FH-2 407. This is done in a transparent manner to UE 410. Local cloud RAN 404 allocates and processes separate UL and DL resources for such UEs 410 while all other UEs 401 are handled by remote cloud RAN 408. A controller 406 manages the coordination of resources between local cloud RAN 404 and remote cloud RAN 408. Controller 406 takes input from a BBU in remote cloud RAN 408 to control switch 405 and organizes the transmission and reception to/from RRU 402.

This controller function can be done at a BBU in local cloud RAN 404 since it is near to the RRU 402 (i.e., almost ideal fronthaul delay, e.g., <250 μs). A local EPC 411 allows low latency access to local cloud RAN 404 by implementing core network functions at the local network edge. Local EPC 411 splits the control and user plane operations within Serving Gateway (SGW) (not shown) and Packet Data Network Gateway (PGW) (not shown) network entities. This allows user plane operations to be implemented locally, while control plane operations remain under the control of the mobile network operator (MNO) (not shown), and can be located at the edge, in the cloud, or centrally. Local EPC 411 can also integrate the private branch exchange (PBX) capabilities for enterprise deployments without the need for configuration via the MNO.

If a UE supports both latency-tolerant and latency-sensitive applications, it is given multiple connections (different APNs) and based on its connection request from the application, it is routed to a local cloud network or a remote network.

The scheduler (not shown in FIG. 4) of local cloud RAN 404 and the scheduler (not shown in FIG. 4) of remote cloud RAN 408 need to co-operate to share time-frequency resources (e.g., to allocate bandwidth) for the cloud RAN which is handled by controller 406. All UE-specific functions are handled independently by both local cloud RAN 404 and remote cloud RAN 408. The cell-specific functions can be handled by RRU 402.

Figure 5:
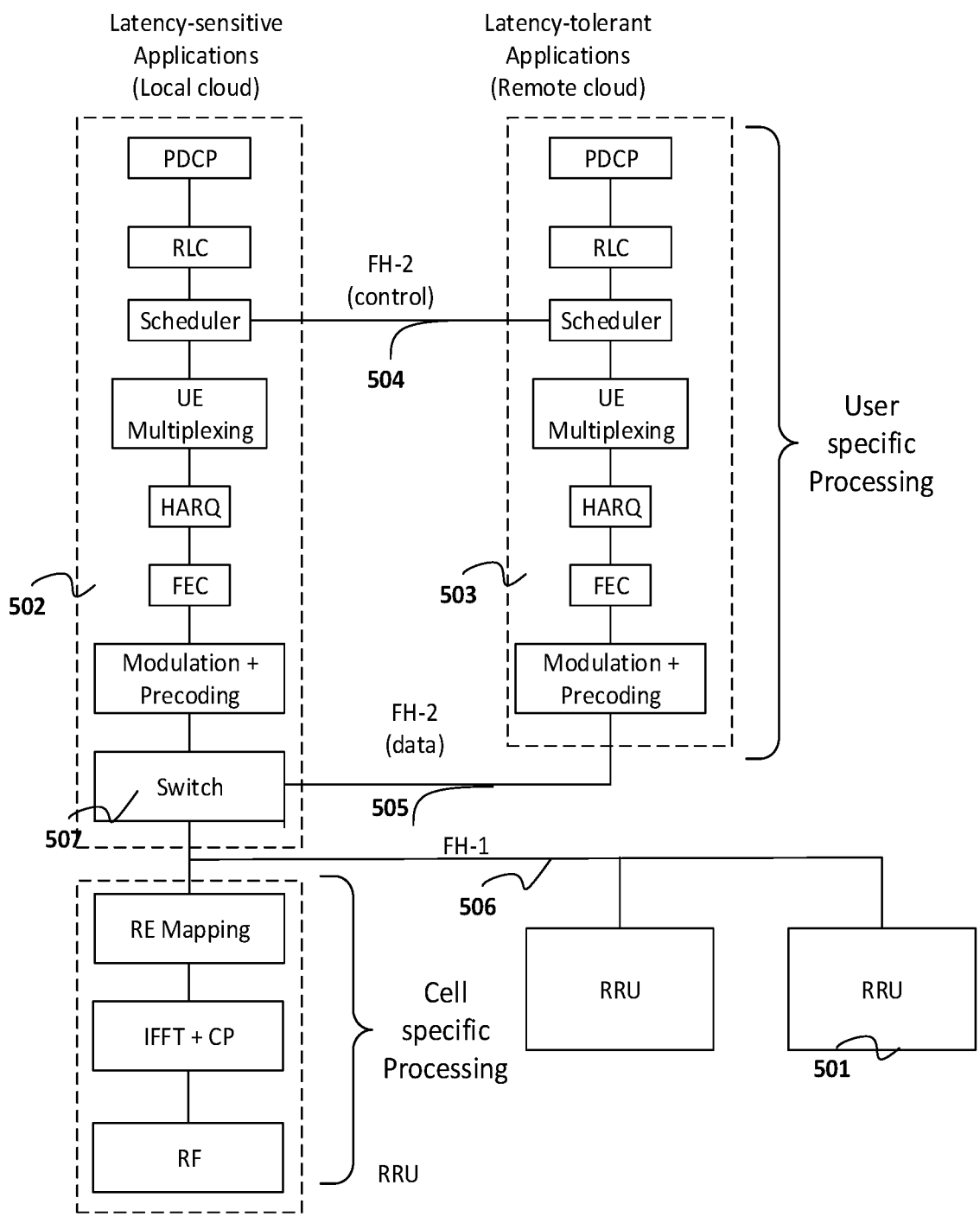
FIG. 5 illustrates processing split between remote cloud and local cloud processing.

FIG. 5 shows processing split between remote cloud and local cloud processing. A local cloud RAN 502 schedules the low latency applications while a remote cloud RAN 503 schedules the latency-tolerant applications. The time-frequency resources are shared between local cloud RAN 502 and remote cloud RAN 503 based on the scheduler interaction between local cloud RAN 502 and remote cloud RAN 503 via an FH-2 control interface 504. The scheduler interaction is not at a per sub-frame (1 ms) level due to the latency involved in remote cloud RAN 503 but at a slower rate, i.e., semi-static configuration, to adapt to the change in network conditions (e.g., several hundred milliseconds). Reference signals and synchronization signals can be generated either in local cloud RAN 502 or at remote cloud RAN 503 or at an RRU 501 itself, depending on the type of reference signal. For example, Primary synchronization sequence (PSS) and secondary synchronization sequence (SSS) synchronization signals that are cell-specific can be generated at RRU 501, while demodulation reference signals (DMRS) that are user-specific can be generated in local cloud RAN 502 or remote cloud RAN 503 based on the latency requirement of the application from the UE. Data from remote cloud RAN 503 is sent to local cloud RAN 502 using an FH-2 data interface 505. Multiple RRUs can also be connected to local cloud RAN 502 using an FH-1 interface 506. The user specific processing in local cloud RAN 502 can consist of blocks such as modulation and precoding, the forward error correction (FEC), the hybrid automatic repeat request (HARQ) and further processing of the RAN protocol stack. Note that other splits are also possible, where more functions of the RAN protocol can be moved between local cloud RAN 502 and the RRUs. Also, a switch 507 can be external to local cloud RAN 502, and can be a router, for example. Switch 507 distributes data for processing either in local cloud RAN 502 or in remote cloud RAN 503 depending on the latency requirements of an application from a UE.

In case the RRU uses dedicated hardware that can process the entire PHY, it is possible to support a MAC-PHY split as the basis for the fronthaul interface FH-1. In this case, the UE processing from the MAC can be multiplexed to the RRU. In this case, the FH-1 interface to the RRU becomes similar to the nFAPI interface that is supported by the SFC.

Figure 6:
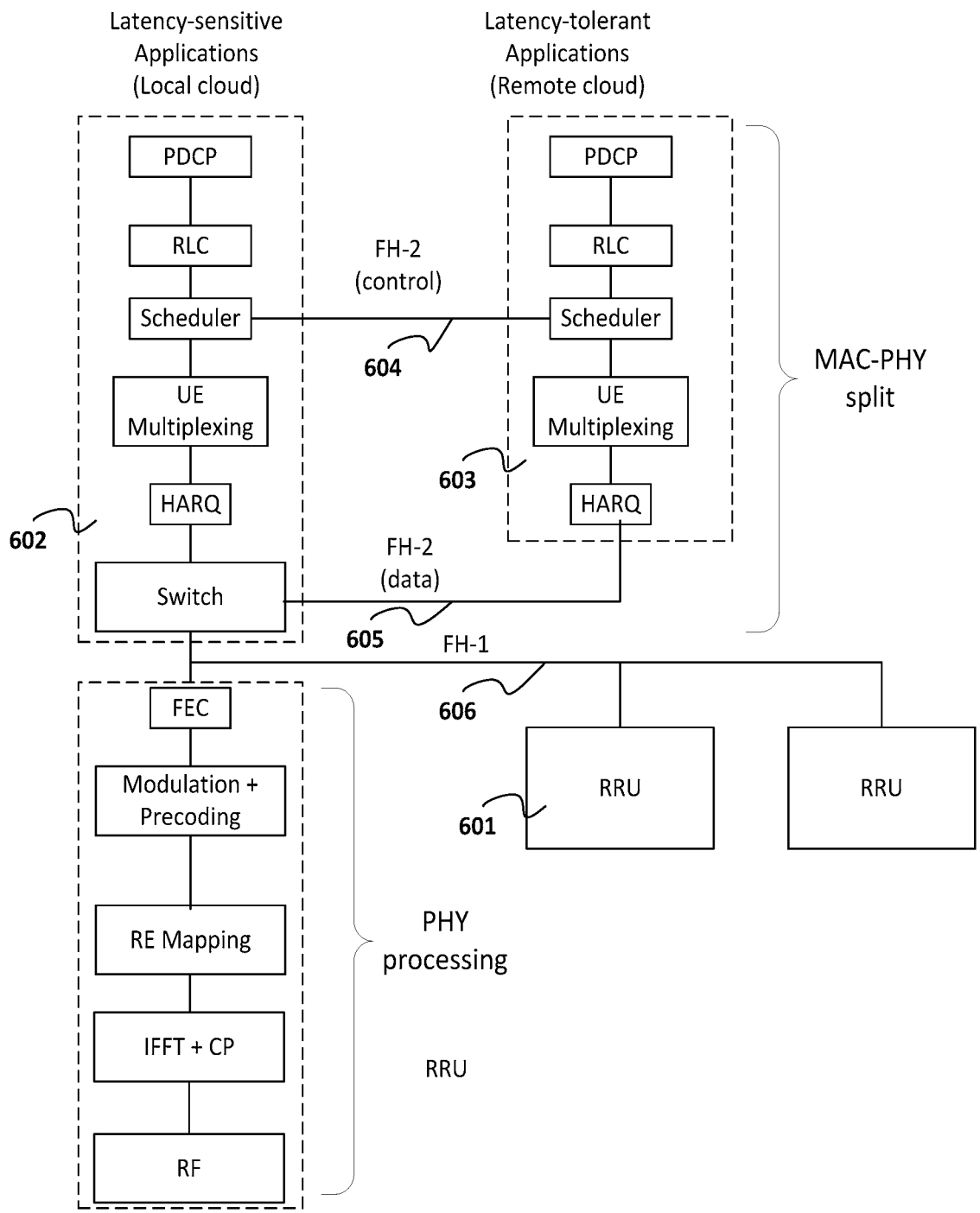
FIG. 6 illustrates an alternative processing split at the MAC-PHY interface between a local cloud and a remote cloud.

FIG. 6 illustrates an alternative processing split at an MAC-PHY interface between a local cloud RAN 602 and a remote cloud RAN 603. Local cloud RAN 602 schedules the low latency applications while remote cloud RAN 603 schedules the latency-tolerant applications. The time-frequency resources are shared between local cloud RAN 602 and remote cloud RAN 603 based on the scheduler interaction between local cloud RAN 602 and remote cloud RAN 603 via an FH-2 control interface 604. In this case, the entire PHY is processed in an RRU, e.g., RRU 601. Data from remote cloud RAN 603 is sent to local cloud RAN 602 using an FH-2 data interface 605. Multiple RRUs can also be connected to local cloud RAN 602 using an FH-1 interface 606.

5G also supports network slicing, where low latency applications may use different OFDM numerologies than latency-tolerant applications. For example, the latency-sensitive application may use a different transmission time interval (TTI) and use a different sub-carrier spacing and FFT sizes, compared to the latency-tolerant application. In this case, the entire PHY could be different for the local cloud RAN and the remote cloud RAN. This feature can be used to support network slicing, where the remote cloud RAN and the local cloud RAN operate differently with different parameters and numerology based on the application.

Figure 7:
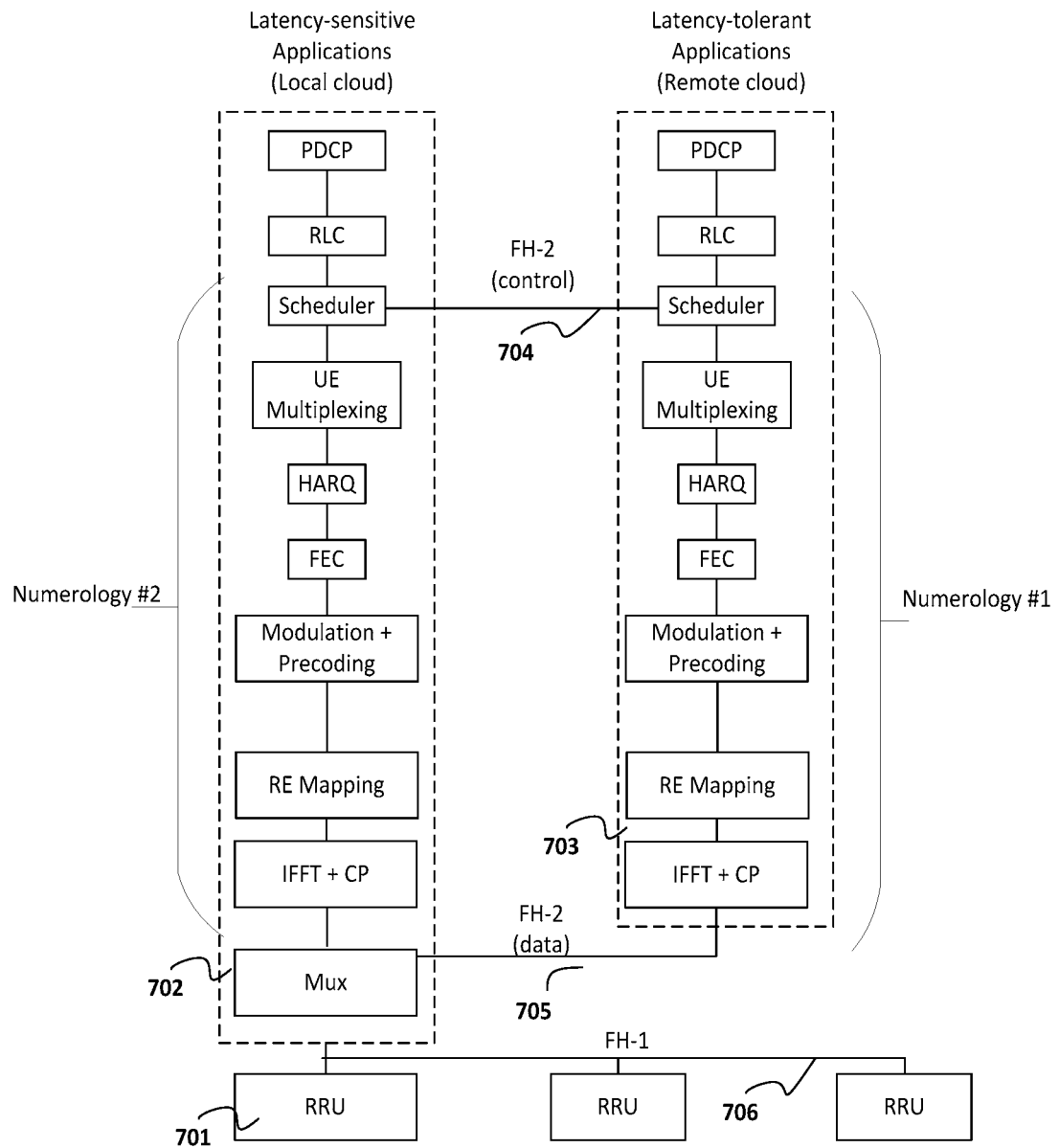
FIG. 7 illustrates a split between local and remote cloud processing using different numerologies.

FIG. 7 shows a split between local and remote cloud processing using different numerologies. In this case, the entire PHY and MAC processing can be different between a local cloud RAN 702 and a remote cloud RAN 703. For example, the frame structure (transmission time intervals), OFDM numerology such as sub-carrier spacing, bandwidth, etc. could be different between local cloud RAN 702 and a remote cloud RAN 703. In this case, an RRU 701 has very limited functionality related to critical timing related features and compression of a fronthaul interface FH-1 706 while most of the processing for the PHY and MAC is performed differently in local cloud RAN 702 and remote cloud RAN 703 based on the numerology adapted for the application. Time-frequency resources are shared between local cloud RAN 702 and remote cloud RAN 703 based on scheduler interaction between local cloud RAN 702 and remote cloud RAN 703 via an FH-2 control interface 704. Data from remote cloud RAN 703 is sent to local cloud RAN 702 using an FH-2 data interface 705. Multiple RRUs can also be connected to local cloud RAN 702 using an FH-1 interface 706.

In some latency-critical applications for 5G, it is possible that there is insufficient time for resource negotiation at the scheduler. In such cases, the local cloud RAN may overlap its resources with the remote cloud RAN, where the overlap is designed such that the remote cloud RAN resources may still operate with reduced functionality (e.g., punctured or transmitted at very low power) in the common region. In cases, when possible, the local cloud RAN tries to negotiate resources with the remote cloud RAN for resource management.

Figure 8:
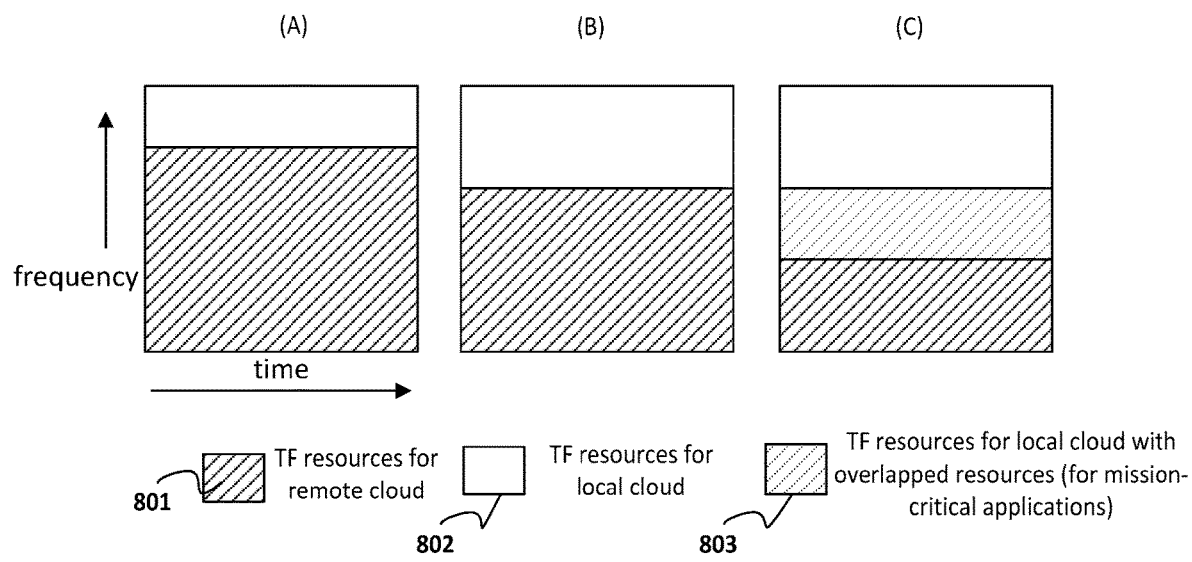
FIG. 8 illustrates time-frequency (TF) resources being shared between local and remote cloud processing.

FIG. 8 illustrates time-frequency (TF) resources (e.g., a time resource and/or a bandwidth or frequency resource) being shared between local and remote cloud processing. For example, allocation of a frequency resource means allocation of a frequency or a bandwidth. There is a pre-defined (but adaptive) allocation of resources between local and remote BBUs (i.e., a BBU in the local cloud RAN, and a BBU in the remote cloud RAN). The allocation of resources could be done by an independent controller, which takes the input of both BBUs, or done by one of the BBUs (i.e., master/slave setting). Section (A) shows a partitioning of resources at time instant T1. In this case, a remote cloud RAN allocates resources 801 for its UEs while allowing resources 802 for processing latency-sensitive UEs. Resource utilization information for local cloud RAN UEs is then transferred to the remote cloud RAN on a periodic basis or per request. If the resources used exceed a threshold, the remote cloud RAN may re-adjust its resource allocation to allow greater resources for the local processing. Section (B) shows a dynamic change in partitioning at time instant T2 (T2>T1) after resource re-negotiation. It is also possible that there could be certain latency-sensitive UEs that may need immediate allocation without any time for re-negotiation. In such cases, the local cloud RAN may schedule transmissions on resources overlapped with the remote cloud RAN in a certain region 803. The remote cloud RAN transmission in region 803 is designed such that it can accommodate overlapping transmissions (or work under high interference conditions). Section (C) shows an overlapped transmission at time instant T3 (T3>T2), where there is no time to negotiate for resources for some mission-critical applications. The X and Y axis in FIG. 8 could represent time and frequency resources or vice-versa.

It is possible to split the resources in the frequency domain between the local cloud RAN and remote cloud RAN to keep the scheduling simple between the local cloud RAN and remote cloud RAN and also to allow for variable delay in the remote cloud RAN.

Figure 9:
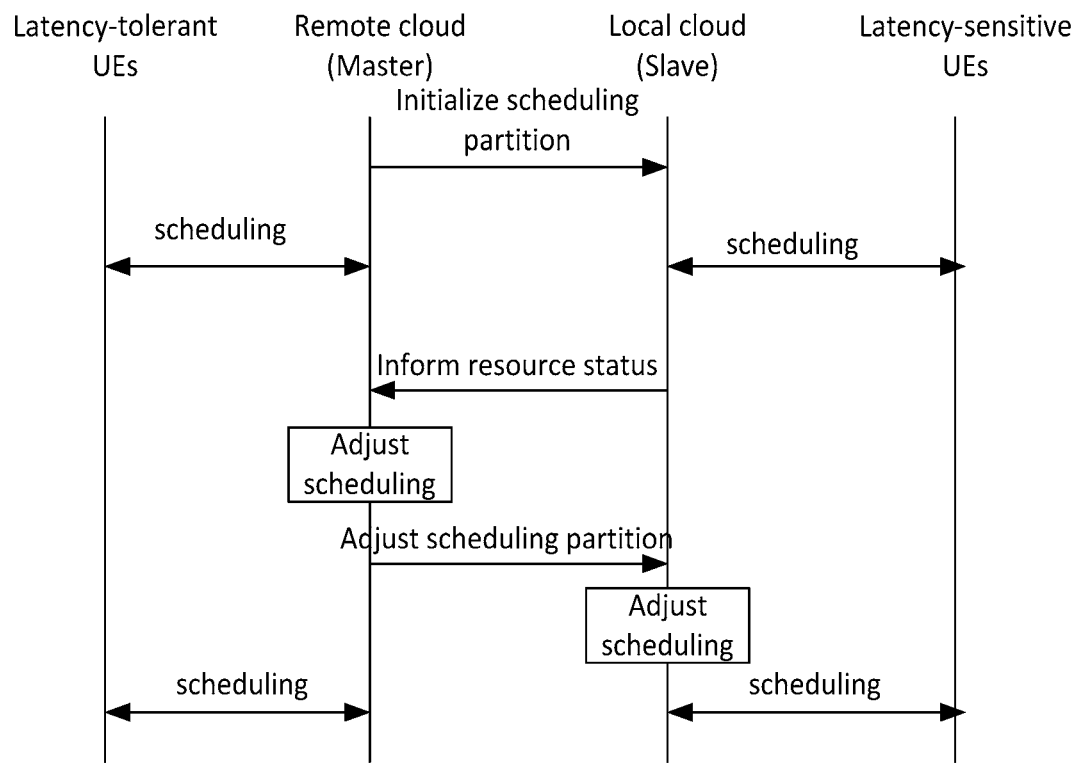
FIG. 9 illustrates a time-frequency resource negotiation procedure between local and remote clouds.

FIG. 9 illustrates a time-frequency resource negotiation procedure between a local cloud RAN and a remote cloud RAN. In order to schedule resources, the remote cloud RAN acts as a master to define a frequency allocation. The local cloud RAN periodically (or upon request) reports its resource utilization to the remote cloud RAN. If the local cloud RAN resource utilization is above a first threshold or below a second threshold, for example, the remote cloud RAN will adjust its scheduling resources to increase or decrease its resources and inform the local cloud RAN of the change.

Supporting low latency applications will be one of the critical features for cloud RAN systems. The present disclosure provides a method and a system to handle low latency without overburdening the local cloud RAN to support the entire BBU processing for all applications.

The present document discloses the following features:

A split cloud radio access network (RAN) architecture, where RAN processing is split between a local cloud RAN and a remote cloud RAN with a non-ideal fronthaul, where the local cloud RAN processes only latency-sensitive applications, and the remote cloud RAN processes latency-tolerant applications.

A method for coordinating scheduling of latency-sensitive and latency-tolerant UEs, where the remote cloud RAN scheduler informs the local cloud RAN scheduler of the available time/frequency resources for scheduling the latency-sensitive UEs, and the local cloud RAN scheduler independently schedules the latency-sensitive UEs, based on the provided time/frequency resources.

A method for coordinating the scheduling where the local cloud informs the remote cloud of its current resource usage for supporting latency critical applications, which is used by the remote cloud to adjust the resource allocation split between the local and remote cloud.

A split cloud RAN architecture, where the user level processing is done either in the remote or local cloud based on the latency-sensitive application, while the cell level processing is done at the RRU.

A split cloud RAN architecture, where both the local and remote clouds process the MAC and upper layers, while the PHY layer is implemented at the RRU.

A split cloud RAN architecture, where the local cloud implements a waveform numerology optimized for low latency applications, while the remote cloud implements a different waveform numerology that is more suitable for latency-tolerant applications.

Figure 10:
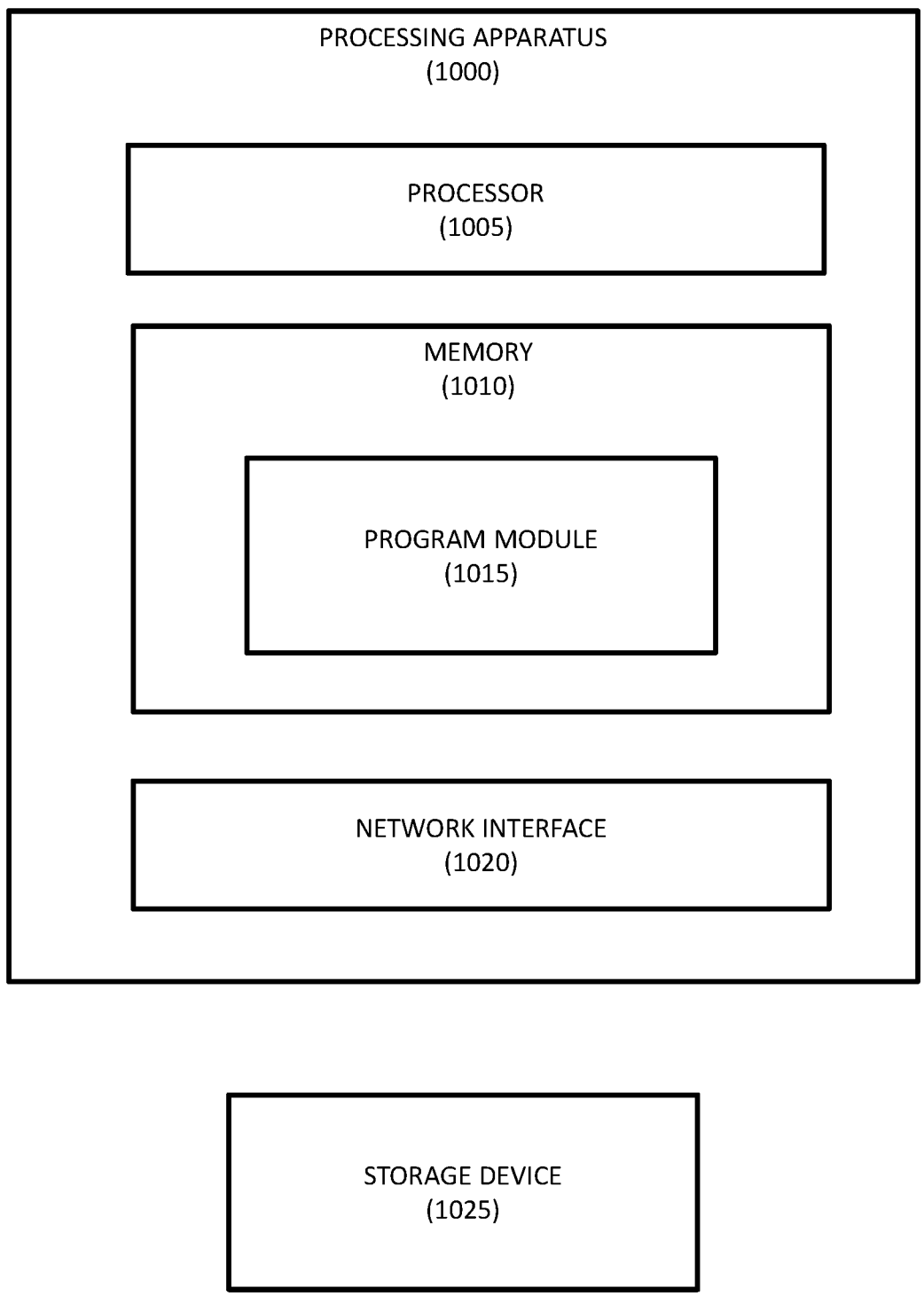
FIG. 10 is a block diagram of a processing apparatus.

FIG. 10 is a block diagram of a processing apparatus 1000, e.g., a computer, that may be included as a component of a BBU, an RRU, an MEC server, a controller, or other device, to perform the processing activities described herein. Processing apparatus 1000 includes a processor 1005, a memory 1010, and a network interface 1020. Although processing apparatus 1000 is represented herein as a stand-alone device, it is not limited to such, but instead can be coupled to other devices (not shown) in a distributed processing system.

Processor 1005 is an electronic device configured of logic circuitry that responds to and executes instructions.

Memory 1010 is a tangible, non-transitory, computer-readable storage device encoded with a computer program. In this regard, memory 1010 stores data and instructions, i.e., program code, that are readable and executable by processor 1005 for controlling the operation of processor 1005. Memory 1010 may be implemented in a random access memory (RAM), a hard drive, a read only memory (ROM), or a combination thereof. One of the components of memory 1010 is a program module 1015.

Program module 1015 contains instructions for controlling processor 1005 to execute the various methods and processes described herein. The term "module" is used herein to denote a functional operation that may be embodied either as a stand-alone component or as an integrated configuration of a plurality of subordinate components. Thus, program module 1015 may be implemented as a single module or as a plurality of modules that operate in cooperation with one another. Moreover, although program module 1015 is described herein as being installed in memory 1010, and therefore being implemented in software, it could be implemented in any of hardware (e.g., electronic circuitry), firmware, software, or a combination thereof.

Network interface 1020 is an electronic circuit through which processing apparatus 1000 communicates with other devices in the various networks described herein.

While program module 1015 is indicated as being already loaded into memory 1010, it may be configured on a storage device 1025 for subsequent loading into memory 1010. Storage device 1025 is a tangible, non-transitory, computer-readable storage device that stores program module 1015 thereon. Examples of storage device 1025 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random access memory, and (i) an electronic storage device that is coupled to processing apparatus 1000 via a data communication network, e.g., the Internet.

Figure 11:
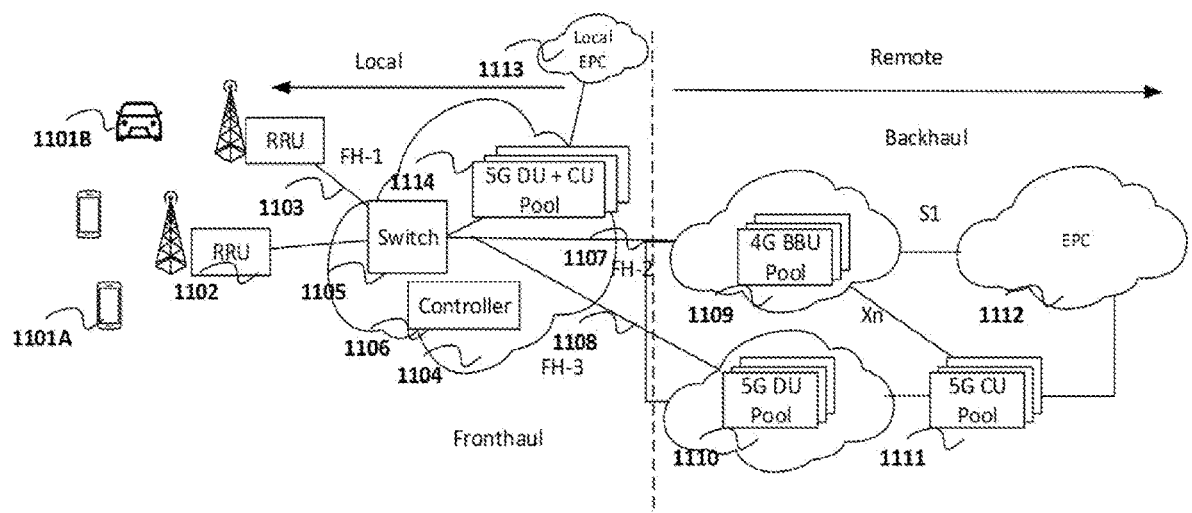
FIG. 11 illustrates a split cloud RAN architecture for a 5G system.

FIG. 11 shows how the principles described herein can be extended to a 5G system where the BBU can be split into a CU (Central Unit) and a DU (Distributed Unit). UEs 1101A and 1101B support both 4G and 5G. RRUs 1102 are connected to a local cloud RAN 1104 via fronthaul interfaces FH-1 1103. Local cloud RAN 1104 includes a controller 1106, a switch 1105, and a 5G BBU DU+CU Pool 1114, and is connected to a local EPC 1113.

UE attach and mobility procedures are handled by a remote 4G BBU pool 1109 and a remote EPC 1112. 5G BBU DU+CU pool 1114 is used for low latency application processing for a data plane while control plane procedures for mobility are handled by a 4G BBU pool 1109. In addition, high data rate but latency-tolerant applications (e.g., file download) can be handled by a 5G DU pool 1110 and a 5G CU pool 1111. 5G CU pool 1111 is connected to 4G pool 1109 via an Xn interface, which is defined in 3GPP for the dual connectivity mode (non-standalone deployment for 5G). The resource sharing for the 5G network between the local 5G BBU DU+CU pool 1114 and remote 5G DU pool 1110 and remote 5G CU pool 1111 can be done similarly to the procedure explained above with reference to FIG. 8.

Depending on the requirements of the applications from UE 1101A and 1101B, controller 1106 controls switch 1105 to distribute data for processing either (a) in local cloud RAN 1104, by 5G BBU DU+CU pool 1114, or (b) in remote cloud RAN 408, by either 4G BBU pool 1109 or 5G DU pool 1110+5G CU pool 1111. Switch 1105 is connected to 4G BBU pool 1109 by a fronthaul interface FH-2 1107, and connected to 5G DU pool 1110 by a fronthaul interface FH-3 1108.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

Definitions of acronyms and abbreviations used herein:
4G fourth generation of broadband cellular technology
5G fifth generation of broadband cellular technology
APN access point name
BBU baseband unit
CP cyclic prefix
C-RAN cloud radio access network
CU central unit
DL downlink
DMRS demodulation reference signals
DU distributed unit
eMBB Enhanced Mobile Broadband
EPC evolved packet core
FEC forward error correction
FFT fast Fourier transform
FH fronthaul
HARQ hybrid automatic repeat request
IFFT inverse fast Fourier transform
IT information technology
LTE Long-Term Evolution
MAC Medium Access Control
MEC Mobile-Edge Computing
mMTC Massive machine-type communication
MNO mobile network operator
NFV Network Functions Virtualization
OFDM orthogonal frequency-division multiplexing
PBX private branch exchange
PDCP Packet Data Convergence Protocol
PGW Packet Data Network Gateway
PHY Physical Layer
PNF physical network function
PSS Primary synchronization sequence
RAN radio access network
RF radio frequency
RLC Radio Link Control
RRH remote radio head
RRU remote radio unit
SCF Small Cell Forum
SGW Serving Gateway
SSS secondary synchronization sequence
TF time-frequency
TRP transmit receive point
TTI transmission time interval
UE user equipment
UL uplink
URLLC Ultra-reliable and low latency communication
VNF virtual network function
vRAN virtualized radio access network

What is claimed is:

1. A system for cloud radio access network (RAN) deployment, wherein said system comprises:
   a local cloud RAN that processes latency-sensitive applications, wherein said local cloud RAN includes a local scheduler and implements a first waveform numerology optimized for said latency-sensitive applications;
   a remote cloud RAN that processes latency-tolerant applications, wherein said remote cloud RAN includes a remote scheduler and implements a second waveform numerology optimized for said latency-tolerant applications;
   a switch that distributes data for said latency-sensitive applications for processing in said local cloud RAN, and distributes data for said latency-tolerant applications for processing in said remote cloud RAN;
   a controller that controls said switch and coordinates time-frequency resources between said local cloud RAN and said remote cloud RAN;
   a first fronthaul interface through which radio units connect to said local cloud RAN; and
   a second fronthaul interface through which said local scheduler and said remote scheduler communicate with one another to share said time-frequency resources.

2. The system of claim 1,
   wherein said remote scheduler informs said local scheduler of available time/frequency resources for scheduling latency-sensitive user equipment, and
   wherein said local scheduler schedules said latency-sensitive user equipment based on said available time/frequency resources.

3. The system of claim 1,
   wherein said local cloud RAN informs said remote cloud RAN of currently available resources that said local cloud RAN has for supporting latency critical applications, and
   wherein said remote cloud RAN adjusts a resource allocation split between said local cloud RAN and said remote cloud RAN.

4. The system of claim 3,
   wherein said resource allocation split is changed based on resources being used by said local cloud RAN exceeding or falling below a threshold.

5. The system of claim 1, further comprising:
   a remote radio unit that performs cell level processing while user level processing is performed at either said local cloud RAN or said remote cloud RAN.

6. The system of claim 1, further comprising:
   a remote radio unit at which is implemented a physical layer of a protocol stack,
   wherein said local cloud RAN and said remote cloud RAN process medium access control and upper layers of said protocol stack.

7. The system of claim 1,
   wherein said system dynamically routes traffic from user equipment, between said local cloud RAN and said remote cloud RAN, based on an access point name change.

8. A method for cloud radio access network (RAN) deployment, wherein said method comprises:
   processing latency-sensitive applications in a local cloud RAN, wherein said local cloud RAN includes a local scheduler and implements a first waveform numerology optimized for said latency-sensitive applications;

processing latency-tolerant applications in a remote cloud RAN, wherein said remote cloud RAN includes a remote scheduler and implements a second waveform numerology optimized for said latency-tolerant applications, utilizing a switch that distributes data for said latency-sensitive applications for processing in said local cloud RAN, and distributes data for said latency-tolerant applications for processing in said remote cloud RAN;

utilizing a controller that controls said switch and coordinates time-frequency resources between said local cloud RAN and said remote cloud RAN;

utilizing a first fronthaul interface through which radio units connect to said local cloud RAN; and utilizing a second fronthaul interface through which said local scheduler and said remote scheduler communicate with one another to share said time-frequency resources.

9. The method of claim 8,
wherein said method further comprises:
said remote scheduler informing said local scheduler of available time/frequency resources for scheduling latency-sensitive user equipment; and
said local scheduler scheduling said latency-sensitive user equipment based on said available time/frequency resources.

10. The method of claim 8, further comprising:
said local cloud RAN informing said remote cloud RAN of currently available resources that said local cloud RAN has for supporting latency critical applications; and
said remote cloud RAN adjusting a resource allocation split between said local cloud RAN and said remote cloud RAN.

11. The method of claim 10, further comprising:
changing said resource allocation split based on resources being used by said local cloud RAN exceeding or falling below a threshold.

12. The method of claim 8, further comprising:
performing cell level processing in a remote radio unit while performing user level processing at either said local cloud RAN or said remote cloud RAN.

13. The method of claim 8, further comprising:
implementing a physical layer of a protocol stack at a remote radio unit; and
processing medium access control and upper layers of said protocol stack at said local cloud RAN and said remote cloud RAN.

14. The method of claim 8, further comprising:
dynamically routing traffic from user equipment, between said local cloud RAN and said remote cloud RAN, based on an access point name change.

* * * * *